(12) United States Patent
Shima

(10) Patent No.: US 9,340,074 B2
(45) Date of Patent: May 17, 2016

(54) PNEUMATIC TIRE WITH SPECIFIED RIM STRIP RUBBER ARRANGEMENT

(71) Applicant: TOYO TIRE & RUBBER CO., LTD., Osaka (JP)

(72) Inventor: Ichiro Shima, Osaka (JP)

(73) Assignee: TOYO TIRE & RUBBER CO., LTD., Osaka-Shi, Osaka (JP)

( * ) Notice: Subject to any disclaimer, the term of this patent is extended or adjusted under 35 U.S.C. 154(b) by 23 days.

(21) Appl. No.: 14/043,194

(22) Filed: Oct. 1, 2013

(65) Prior Publication Data

US 2014/0090765 A1 Apr. 3, 2014

(30) Foreign Application Priority Data

Oct. 2, 2012 (JP) ................................. 2012-220595

(51) Int. Cl.
*B60C 15/06* (2006.01)
*B60C 15/00* (2006.01)
*B60C 15/02* (2006.01)

(52) U.S. Cl.
CPC ................ *B60C 15/02* (2013.01); *B60C 15/06* (2013.01); *B60C 2013/007* (2013.04); *B60C 2013/045* (2013.04); *B60C 2015/009* (2013.04); *B60C 2015/061* (2013.04); *B60C 2015/0614* (2013.04); *Y10T 152/10819* (2015.01); *Y10T 152/10828* (2015.01); *Y10T 152/10837* (2015.01)

(58) Field of Classification Search
CPC ............ B60C 15/06; B60C 2015/0614; Y10T 152/10828; Y10T 152/10837
USPC .................................................. 152/543, 546
See application file for complete search history.

(56) References Cited

U.S. PATENT DOCUMENTS

2009/0188601 A1 7/2009 Kuniyasu
2013/0133806 A1 5/2013 Amano et al.

FOREIGN PATENT DOCUMENTS

| JP | 2001-146105 A | 5/2001 |
|---|---|---|
| JP | 2007-302018 A | 11/2007 |
| JP | 2010-285105 A | 12/2010 |
| JP | 2013-086666 A | 5/2013 |
| JP | 2013-216115 A | 10/2013 |
| WO | 2012/018106 A1 | 2/2012 |

OTHER PUBLICATIONS

Online definition of "pinch", Collins English Dictionary—Complete and Unabridged, HarperCollins Publishers, 2003.*

(Continued)

*Primary Examiner* — Adrienne C Johnstone
(74) *Attorney, Agent, or Firm* — Knobbe Martens Olson & Bear LLP

(57) ABSTRACT

A pneumatic tire has a bead filler, a carcass ply, a side wall rubber and a rim strip rubber. The rim strip rubber has a main portion arranged in an outer side in a tire width direction of the bead filler, and a thin portion arranged between the carcass ply and the side wall rubber. The main portion forms an outer surface of a bead portion. The thin portion extends in the tire diametrical direction at a substantially fixed thickness. An upper end of the thin portion is positioned in an outer side in the tire diametrical direction than an upper end of the bead filler and in an inner side in the tire diametrical direction than a roll-up end of the carcass ply.

6 Claims, 2 Drawing Sheets

(56) References Cited

OTHER PUBLICATIONS

Online definition of "tuck", Collins English Dictionary—Complete and Unabridged, HarperCollins Publishers, 2003.*

Office Action issued Dec. 25, 2013 in corresponding Japanese Application No. 2012-220595.

Office Action issued Jul. 27, 2015 in corresponding CN Application No. 201310397753.6.

Office action issued Mar. 25, 2015 in corresponding German application No. 102013110922.5.

\* cited by examiner

Fig.2A
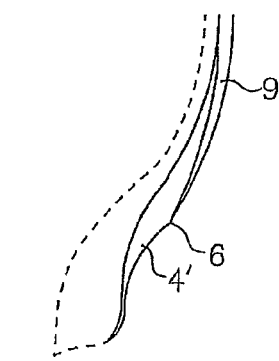
Fig.2B
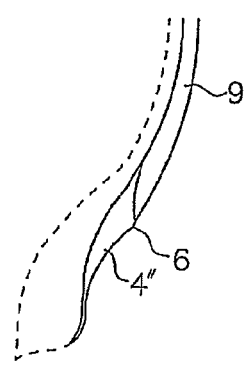
Comparative Example
Fig.2C
Comparative Example

PNEUMATIC TIRE WITH SPECIFIED RIM STRIP RUBBER ARRANGEMENT

BACKGROUND OF THE INVENTION

1. Field of the Invention

The present invention relates to a pneumatic tire which can achieve excellent steering stability and ride comfort.

2. Description of the Related Art

Generally, a pneumatic tire has a bead filler constructed by a hard rubber in a bead portion, thereby enhancing a lateral rigidity so as to secure a steering stability. In a pneumatic tire described in Patent Document 1, in order to achieve a weight saving while securing the steering stability, a height of a bead filler is made smaller, and a height of a rim strip rubber which is harder than the bead filler is increased. However, if the height of the hard rim strip rubber is increased, a flexible zone in a side portion of the tire is narrowed and a vertical rigidity is raised. Accordingly, deterioration of a ride comfort tends to be caused.

Further, in a pneumatic tire described in Patent Document 2, an outer portion of a bead filler constructed by a hard rubber is thinned, whereby a pinch cut resistance can be improved while suppressing the deterioration of the ride comfort. However, it is hard to secure a lateral rigidity of the tire, by making a thickness of the bead filler smaller, whereby there is a risk that the steering stability is lowered.

PRIOR ART DOCUMENTS

Patent Document 1: Japanese Unexamined Patent Publication No. 2001-146105

Patent Document 2: Japanese Unexamined Patent Publication No. 2007-302018

SUMMARY OF THE INVENTION

The present invention is made by taking the actual condition mentioned above into consideration, and an object of the present invention is to provide a pneumatic tire which can achieve excellent steering stability and ride comfort by enhancing a lateral rigidity while suppressing rise of a vertical rigidity.

Means for Solving the Problem

The object can be achieved by the present invention having the following structure. That is, the present invention provides a pneumatic tire comprising a bead filler which extends to an outer side in a tire diametrical direction from a bead core buried in a bead portion and is formed as a cross sectional shape having three vertices connected with curvilinear lines, a carcass ply which reaches the bead portion from a tread portion via a side wall portion, and is rolled up in such a manner as to pinch the bead core and the bead filler such that the carcass ply comes into contact with itself on an outer side in the tire diametrical direction of the bead filler, a side wall rubber which is provided in an outer side of the carcass ply and forms an outer surface of the side wall portion, and a rim strip rubber which is connected to an inner side in the tire diametrical direction of the side wall rubber, wherein the rim strip rubber has a main portion which is arranged in an outer side in a tire width direction of the bead filler and forms an outer surface of the bead portion, and a thin portion which is arranged between the carcass ply and the side wall rubber and extends in the tire diametrical direction at a substantially fixed thickness which is less than the maximum thickness of the main portion, and wherein an upper end of the thin portion is positioned in an outer side in the tire diametrical direction than an upper end of the bead filler and in an inner side in the tire diametrical direction than a roll-up end of the carcass ply.

The rim strip rubber provided in the tire extends long in the tire diametrical direction so as to improve a lateral rigidity of the tire by having the thin portion as mentioned above, and all the same time the rise of the vertical rigidity can be suppressed. Further, since the upper end of the thin portion is arranged between the upper end of the bead filler and the roll-up end of the carcass ply, the rigidity of the side portion of the tire is reduced little by little from the buttress area to the bead portion, and the tire side portion smoothly deflects and is deformed one by one toward the inner side in the tire diametrical direction at a time of traveling. As a result, it is possible to achieve the excellent steering stability and ride comfort.

In the present invention, it is preferable that the rim strip rubber has a coupling portion which stands between the main portion and the thin portion so as to couple the thin portion with the main portion, and is reduced in its thickness little by little from the main portion toward an outer side in the tire diametrical direction. According to the structure mentioned above, a rigidity change between the main portion and the thin portion becomes slow, and it is possible to well improve the ride comfort.

In the present invention, it is preferable that a thickness of the thin portion is equal to or less than 0.3 times a maximum thickness of the rim strip rubber. Accordingly, it is possible to well improve the ride comfort by appropriately suppressing the rise of the vertical rigidity by the rim strip rubber.

In the present invention, it is preferable that an upper end of the thin portion is positioned at an intermediate point between the upper end of the bead filler and the roll-up end of the carcass ply or a position closer to the outer side in the tire diametrical direction than the intermediate point. Accordingly, it is possible to well improve the steering stability by appropriately enhancing the lateral rigidity of the tire.

In the present invention, it is preferable that a length in the tire diametrical direction of the thin portion is between 0.1 and 0.3 times a height in the tire diametrical direction from a reference line extending in the tire width direction through an outer end in the tire diametrical direction of the bead core, to an outermost diameter position of the tire. Accordingly, the thin portion is formed at an appropriate length, and the excellent steering stability and ride comfort can be achieved.

BRIEF DESCRIPTION OF THE DRAWINGS

FIG. 2A is a cross sectional view showing aspect of rim strip rubber according to a working example.

FIGS. 2B and 2C are cross sectional views showing aspects of rim strip rubbers according to comparative examples.

DETAILED DESCRIPTION OF THE PREFERRED EMBODIMENTS

Figure 1:
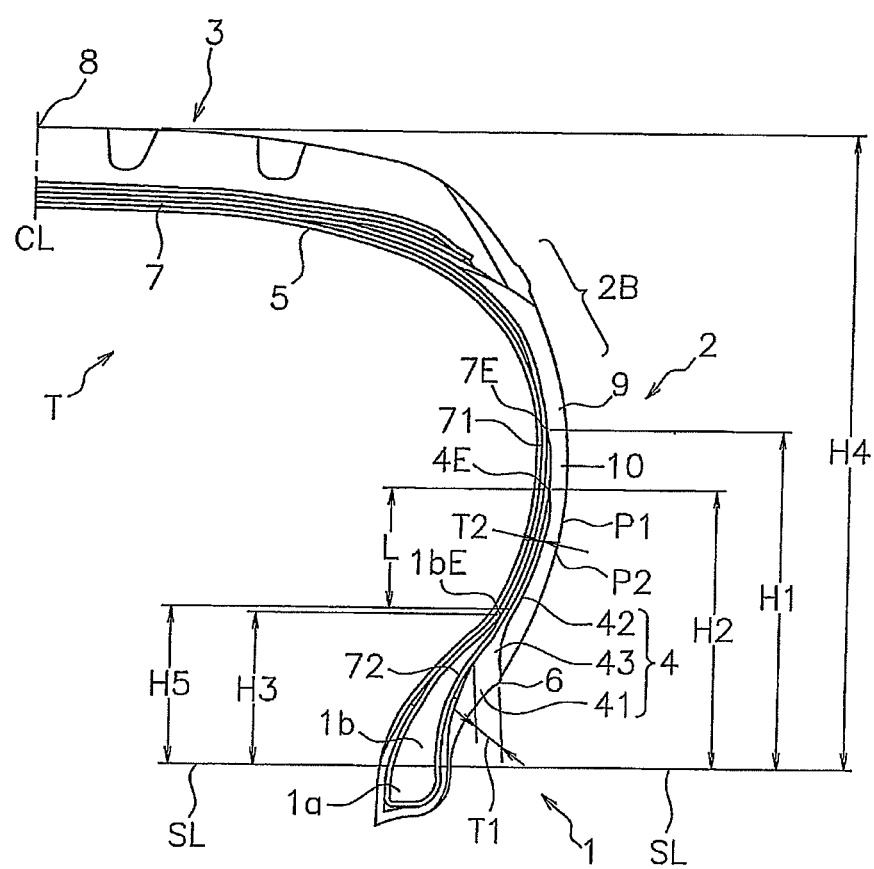
FIG. 1 is a half cross sectional view of a tire meridian showing an example of a pneumatic tire in accordance with the present invention.

An embodiment of the present invention will be explained with reference to the drawings.

FIG. 1 is a half cross sectional view of a tire meridian showing an example of a pneumatic tire in accordance with the present invention. A dimension of each of portions of a tire T is measured in a no-load state in which the tire is attached to a normal rim and is filled with a normal internal pressure. A rubber interface as illustrated can be specified in a cross section of a cured tire, and can be discriminated on the basis of a nature of the rubber interface which is observed thin in its cross section, for example, by cutting the tire with an edged cutting tool.

The normal rim is a rim which is determined per tire by a standard system including a standard on which the tire is based, for example, is a standard rim in JATMA, "Design Rim" in TRA, or "Measuring Rim" in ETRTO. The normal internal pressure is a pneumatic pressure determined per tire by a standard system including a standard on which the tire is based, and is a maximum pneumatic pressure in JATMA, a maximum value described in Table "TIRE LOAD LIMITS AT VARIOUS COLD INFLATION PRESSURES" in TRA, or "INFLATION PRESSURE" in ETRTO, however, in the case that the tire is for a passenger car, it is set to 180 kPa.

The tire T includes a pair of bead portions 1, side wall portions 2 extending from the bead portions 1 to outer side in a tire diametrical direction, a tread portion 3 connected to outer ends in a tire diametrical direction of the side wall portions 2. A buttress area 2B is an outside area in a tire diametrical direction of the side wall portion 2, and is an area which is not grounded at a normal traveling time on a flat paved road. An annular bead core 1a is buried in the bead portion 1, the annular bead core 1a being constructed by coating a converged body of steel wires with a rubber.

The tire T is further provided with a bead filler 1b which extends to an outer side in a tire diametrical direction from the bead core 1a and is formed as a triangular cross sectional shape, a carcass ply 7 which reaches the bead portion 1 from the tread portion 3 via the side wall portion 2 and is rolled up so as to pinch the bead core 1a and the bead filler 1b, a side wall rubber 9 which is provided in an outer side of the carcass ply 7 and forms an outer surface of the side wall portion 2, and a rim strip rubber 4 which is connected to an inner side in the tire diametrical direction of the side wall rubber 9.

The carcass ply 7 is provided in series with a main body portion 71 which reaches the bead portion 1 from the tread portion 3 via the side wall portion 2, and a roll-up portion 72 which is rolled up to an outer side from an inner side in a tire width direction around the bead core 1a, and is formed as a toroidal shape as a whole. A roll-up end 7E is an end portion of the roll-up portion 72. The carcass ply 7 is formed by coating cords arranged in a direction which is approximately orthogonal to a tire equator CL with a rubber. An inner liner rubber 5 for holding a pneumatic pressure is provided in an inner side of the carcass ply 7.

The rim strip rubber 4 is formed by a hard rubber which is excellent in a wear resistance, the rim strip rubber 4 being provided at a position which comes into contact with a rim (not shown) to which the tire T is attached. The rim strip rubber 4 has a main portion 41 which is arranged in an outer side in the tire width direction of the bead filler 1b constructed by the hard rubber so as to form an outer surface of the bead portion 1, and a thin portion 42 which is arranged between the carcass ply 7 and the side wall rubber 9 so as to extend in a tire diametrical direction with a substantially fixed thickness, the rim strip rubber 4 being formed as a shape which extends long in the tire diametrical direction.

A rim line 6 is provided on the boundary between the rim strip rubber 4 and the side wall rubber 9 for checking out whether or not the tire T is appropriately attached to the rim. The rim line 6 extends in a tire circumferential direction so that a distance between the rim line and a flange outer edge of the rim to which the tire T is attached is constant. In the present embodiment, a maximum thickness T1 of the rim strip rubber 4 is measured on the rim line 6. Each of the thickness T1 and a thickness T2 mentioned later is defined along a normal line of a curved inner surface of the rim strip rubber 4.

An upper end 4E of the thin portion 42 of the rim strip rubber 4 is positioned in an outer side in the tire diametrical direction than an upper end 1bE of the bead filler 1b and in an inner side in the tire diametrical direction than the roll-up end 7E of the carcass ply 7. In other words, in the tire T, a height H1 of the roll-up end 7E of the carcass ply 7, a height H2 of the upper end 4E of the thin portion 42, and a height H3 of the upper end 1bE of the bead filler 1b satisfy a relationship of H1>H2>H3. Each of the heights H1, H2 and H3 is a height from a reference line SL which extends in the tire width direction through an outer end in the tire diametrical direction of the bead core 1a.

A lateral rigidity of the tire is improved by the rim strip rubber 4 which has the thin portion 42 and extends long in the tire diametrical direction, while an increase of a vertical rigidity is suppressed. Further, since the upper end 4E of the thin portion 42 is arranged between the upper end 1bE of the bead filler 1b and the roll-up end 7E of the carcass ply 7, the rigidity of the side portion of the tire is reduced little by little from the buttress area 2B to the bead portion 1, and the tire side portion smoothly deflects and is deformed one by one toward the inner side in the tire diametrical direction at a time of traveling. As a result, it is possible to achieve the excellent steering stability and ride comfort.

The rim strip rubber 4 according to the present embodiment has a coupling portion 43 which is interposed between the main portion 41 and the thin portion 42 so as to couple both the elements and is reduced in its thickness little by little toward the outer side in the tire diametrical direction from the main portion 41. Accordingly, the rim strip rubber 4 has the main portion 41 which is increased in its thickness little by little toward the outer side in the tire diametrical direction from the vicinity of a bead heel, the coupling portion 43 which is reduced in its thickness little by little toward the outer side in the tire diametrical direction from the position having the maximum thickness T1, and the thin portion 42 which extends to the outer side in the tire diametrical direction with the substantially fixed thickness T2.

For appropriately suppressing the rise of the vertical rigidity by the rim strip rubber 4, the thickness T2 of the thin portion 42 is preferably equal to or less than 0.3 times the maximum thickness T1, and is more preferably equal to or less than 0.2 times the maximum thickness T1. Further, in order to appropriately improve the lateral rigidity by the rim strip rubber 4, the thickness T2 is preferably equal to or more than 0.15 times the maximum thickness T1. The thickness T2 is set, for example, between 0.75 and 1.25 mm. In order to achieve excellent steering stability and ride comfort, the length L in the tire diametrical direction of the thin portion 42 is preferably between 0.1 and 0.3 times a height H4 in the tire diametrical direction from the reference line SL to a tire outermost diameter position 8, and is more preferably between 0.15 and 0.25 times the height H4.

The roll-up end 7E is positioned in an outer side in the tire diametrical direction than a tire maximum width position 10. The upper end 4E is arranged in an inner side in the tire diametrical direction than the roll-up end 7E, and is preferably positioned in an inner side in the tire diametrical direction than the tire maximum width position 10. For example, the height H2 of the upper end 4E is set between 0.6 and 0.8 times the height H1 of the roll-up end 7E. The upper end 4E of the thin portion 42 is preferably positioned at the same height as an intermediate point P1 between the upper end 1bE and the roll-up end 7E or a position closer to the outer side in the tire diametrical direction than the intermediate point P1. A height of the intermediate point P1 from the reference line SL comes to a value obtained by an equation H3+(H1−H3)/2.

For suppressing the rise of the vertical rigidity of the tire, the height H3 of the upper end 1bE is preferably equal to or less than 0.3 times the height H4. A height H5 of a start position of the thin portion 42 from the reference line SL is preferably equal to or more than the height H3. Further, the height H5 is preferably equal to or less than the intermediate point P1, and is more preferably equal to or less than an intermediate point P2 between the upper end 4E and the roll-up end 7E. A height of the intermediate point P2 from the reference line SL comes to a value obtained by an equation H3+(H2−H3)/2. A start position of the thin portion 42 is a position which begins to be equal to or less than 0.3 times the maximum thickness T1 toward the outer side in the tire diametrical direction from the position of the maximum thickness T1.

Each of a modulus Mf of the bead filler 1b and a modulus Mr of the rim strip rubber 4 is higher than a modulus Ms of the side wall rubber 9. Further, in order to appropriately suppress the rise of the vertical rigidity of the tire, the modulus Mr is preferably lower than the modulus Mf. In this case, there is exemplified a structure in which the modulus Ms is less than 3 MPa, the modulus Mr is between 3 and 5 MPa, and the modulus Mf goes beyond 5 MPa. The modulus indicates 100% extension modulus (M100) which is measured on the basis of JISK6251.

In the present embodiment, there is shown the example in which the tire T is provided with one carcass ply 7, however, the tire T may be provided with a plurality of laminated carcass plies, without being limited to this. In this case, the positional relationship concerning the roll-up end of the carcass ply mentioned above may be satisfied at least in one layer of carcass ply; however, it is desirably satisfied in all the carcass plies.

The pneumatic tire in accordance with the present invention is the same as the normal pneumatic tire except the structure as mentioned above of the rim strip rubber, and the present invention can employ any of the conventionally known material, shape, structure, manufacturing method and the like. The structure of the rim strip rubber as mentioned above may be applied at least to one side of the tire; however, it is preferably applied to both sides of the tire for enhancing an effect of improvement.

The present invention is not limited to the embodiment mentioned above, but can be improved and modified variously within the scope of the present invention.

EXAMPLES

In order to specifically indicate the structure and the effect of the present invention, the steering stability and the ride comfort were evaluated, and a description will be given below of the evaluations. Each of the performance evaluations was carried out on the basis of a feeling test (a subjective evaluation) by a driver, by attaching the tire to a sedan type car and executing a straight running travel and a cornering travel. Each of the performances was evaluated by an index number while setting the result of a comparative example 1 to 100, and as the numerical value increases, the performance is much more excellent.

A size of the tire used for evaluation is 185/65R15, and the height H4 from the reference line to the tire outermost diameter position is 112 mm. Except items shown in Table 1, tire structures and rubber compositions in the examples are common. FIG. 2A shows an aspect of FIG. 1 mentioned above. In FIG. 2B, a thickness of a rim strip rubber 4' is reduced little by little from the rim line 6 toward an outer side in a tire diametrical direction to the upper end. A rim strip rubber 4" in FIG. 2C only has the main portion and the coupling portion shown in FIG. 1, and does not have a portion corresponding to the thin portion.

TABLE 1

|  |  | Comparative Example 1 | Comparative Example 2 | Comparative Example 3 | Comparative Example 4 | Comparative Example 5 | Working Example 1 | Working Example 2 | Working Example 3 |
|---|---|---|---|---|---|---|---|---|---|
| aspect |  | FIG. 2B | FIG. 2B | FIG. 2B | FIG. 2C | FIG. 2A | FIG. 2A | FIG. 2A | FIG. 2A |
| modulus | Mf | 10 | 4 | 10 | 10 | 10 | 10 | 10 | 10 |
| (MPa) | Mr | 4 | 10 | 4 | 4 | 4 | 4 | 4 | 4 |
|  | Ms | 1.3 | 1.3 | 1.3 | 1.3 | 1.3 | 1.3 | 1.3 | 1.3 |
| height | H1 | 60 | 60 | 60 | 60 | 35 | 60 | 60 | 60 |
| (mm) | H2 | 50 | 50 | 32 | 27 | 50 | 50 | 50 | 50 |
|  | H3 | 27 | 27 | 27 | 27 | 27 | 27 | 27 | 27 |
|  | H5 | — | — | — | — | 30 | 32 | 28 | 36 |
| thickness | T1 | 5 | 5 | 5 | 5 | 5 | 5 | 5 | 5 |
| (mm) | T2 | — | — | — | — | 1 | 1 | 1 | 1 |
| steering stability |  | 100 | 105 | 93 | 90 | 90 | 105 | 103 | 107 |
| ride comfort |  | 100 | 90 | 105 | 107 | 105 | 105 | 107 | 103 |

As shown in Table 1, in comparison with the comparative examples 1 to 5, good steering stability and ride comfort can be achieved in the working examples 1 to 3. It seems that this result is caused by the fact that the lateral rigidity can be enhanced while suppressing the rise of the vertical rigidity of the tire, by being provided with the rim strip rubber having the shape as mentioned above.

What is claimed is:
1. A pneumatic tire comprising:
a bead filler which extends to an outer side in a tire diametrical direction from a bead core buried in a bead portion and is formed as a cross sectional shape having three vertices connected with curvilinear lines;
a carcass ply which reaches the bead portion from a tread portion via a side wall portion, and is rolled up in such a manner as to pinch the bead core and the bead filler such that the carcass ply comes into contact with itself on an outer side in the tire diametrical direction of the bead filler;
a side wall rubber which is provided in an outer side of the carcass ply and forms an outer surface of the side wall portion; and
a rim strip rubber which is connected to an inner side in the tire diametrical direction of the side wall rubber, wherein the rim strip rubber has a main portion which is arranged in an outer side in a tire width direction of the bead filler and forms an outer surface of the bead portion, and a thin portion which is arranged between the carcass ply and the side wall rubber and extends in the tire diametrical direction at a fixed thickness which is less than the maximum thickness of the main portion, and wherein an upper end of the thin portion is positioned in an outer side in the tire diametrical direction than an upper end of the bead filler and in an inner side in the tire diametrical direction than a roll-up end of the carcass ply.

2. The pneumatic tire according to claim 1, wherein the rim strip rubber has a coupling portion which stands between the main portion and the thin portion so as to couple the thin portion with the main portion, and is reduced in its thickness little by little from the main portion toward an outer side in the tire diametrical direction.

3. The pneumatic tire according to claim 1, wherein a thickness of the thin portion is equal to or less than 0.3 times a maximum thickness of the rim strip rubber.

4. The pneumatic tire according to claim 2, wherein a thickness of the thin portion is equal to or less than 0.3 times a maximum thickness of the rim strip rubber.

5. The pneumatic tire according to claim 1, wherein an upper end of the thin portion is positioned at an intermediate point P1 between the upper end of the bead filler and the roll-up end of the carcass ply or a position closer to the outer side in the tire diametrical direction than the intermediate point, said intermediate point is obtained by an equation:

$P1=H3+(H1-H3)/2$, where a reference line SL extends in the tire width direction through an outer end in the tire diametrical direction of the bead core, H1 is the diametrical height of the roll-up end of the carcass ply form the reference line SL, and H3 is the diametrical height of the upper end of the bead filler from the reference line SL.

6. The pneumatic tire according to claim 1, wherein a length in the tire diametrical direction of the thin portion is between 0.1 and 0.3 times a height in the tire diametrical direction from a reference line extending in the tire width direction through an outer end in the tire diametrical direction of the bead core, to an outermost diameter position of the tire.

* * * * *